Dec. 23, 1969    R. W. ASTHEIMER    3,486,024
BALANCE TYPE HORIZON SENSOR
Filed April 27, 1966
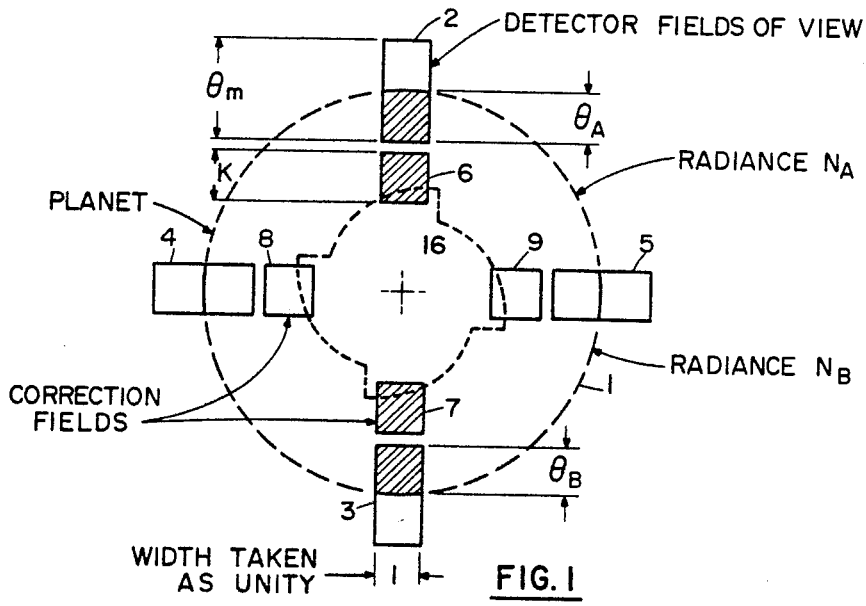
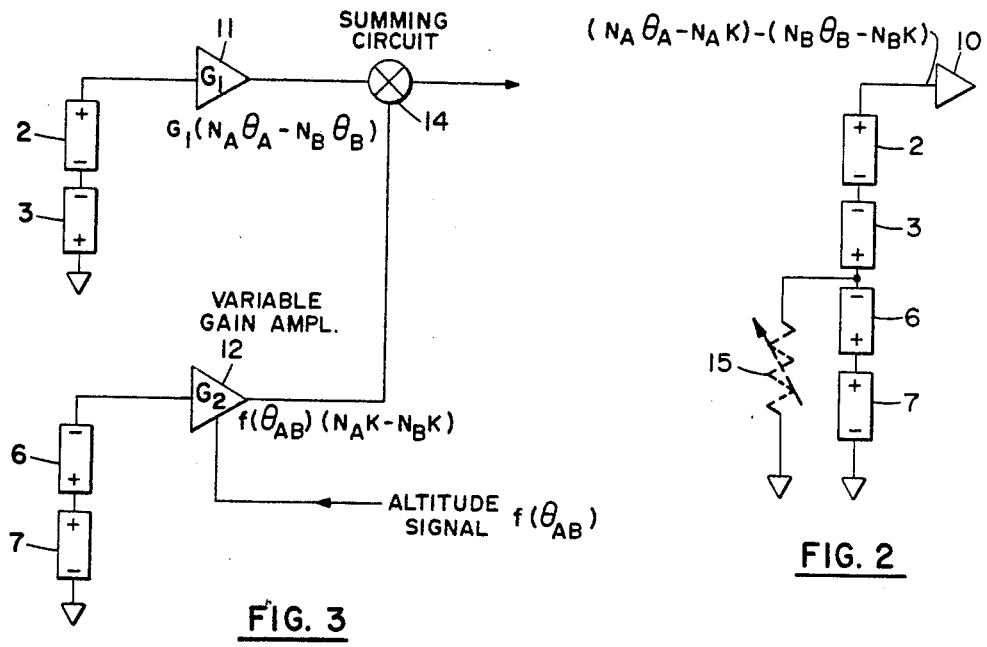
*INVENTOR.*
ROBERT W. ASTHEIMER
BY
Robert James Norton
*ATTORNEY*

United States Patent Office 3,486,024
Patented Dec. 23, 1969

3,486,024
BALANCE TYPE HORIZON SENSOR
Robert W. Astheimer, Westport, Conn., assignor to Barnes Engineering Company, Stamford, Conn., a corporation of Delaware
Filed Apr. 27, 1966, Ser. No. 545,671
Int. Cl. G01c 9/06, 21/00
U.S. Cl. 250—83.3        8 Claims

ABSTRACT OF THE DISCLOSURE

A radiation type horizon sensor is described in which pairs of senors in addition to those viewing the horizons are provided which see only the disk of the body observed. These can be adjusted for differing altitudes either optically or electrically, or where an altitude signal is available in the vehicle, they can be continuously adjusted electrically for varying altitudes.

Background of the invention

A number of horizon sensors have been used in order to give information on the altitude of a high-flying vehicle such as a space vehicle, very high-flying airplane, and the like, and particularly information with respect to any deviation from level attitude with respect to two orthogonal axes represening pitch and roll. One type of horizon sensors has involved scanning across the disk of the earth or other planet by means of movable elements which may, for example, image radiation detectors such as infrared detectors in a scan across the planet disk, including two horizons. Scanners which scan shorter arcs across a horizon by a dithering motion are another type of scanning sensor. These devices require moving parts which not only add to complexity, but can present problems in space vehicles moving for longer periods of time in the vacuum of space which causes lubrication problems due to gradual evaporation of any lubricant.

Another form of scanning sensor utilizes arrays of radiation detectors which are electronically scanned. This type of sensor avoids moving parts, but only at the expense of greater electronic complexity, and the serious problems of non-uniform detector sensitivity. Certain sophisticated optical and electronic modifications have solved to a greater or less extent, these problems, but only at the expense of much more elaborate and complicated electronic circuitry.

In order to avoid some of the problems with the scanning type of horizon sensor, various proposals have been advanced for a radiation balance type of sensor, in which the radiation from areas near the horizons, and usually extending across them, have been compared. Departures from desired level vehicle attitude, such as varying degrees of pitch or roll, upset the radiation balance and can produce signals which indicate departures from the predetermined desired attitude. Such sensors have no moving parts, do not require electronic scanning, and, at least theoretically, permit the use of a minimum number of very simplified electronic circuits.

Balance type sensors assume for their proper operation that the radiance at the various portions of the planet disk represented by the points on the horizon is the same. This is the case on the uniform cloud cover of Venus and at times of uniform sun illumination on the moon or Mars; in the case of the moon this may apply only during full moon or conditions where an illuminated disk has reached thermal equilibrium.

In the case of the earth, which for the time being represents the most important field for usefulness of horizon sensors, the presence of clouds at different points of the horizon great differences in earth temperature, for example where extensive ice sheets are encountered, and the like, present a formidable problem for horizon sensors of the radiation balance type, for which there has as yet been no completely satisfactory simple solution. Even when the radiation signals have been restricted to the emission band of carbon dioxide around 15μ, as is described for horizon sensors having some type of scanning in the patent to Kaufmann No. 3,118,063, Jan. 14, 1964, the problem of radiation balance of sensors is not completely solved, although errors are reduced. Even carbon dioxide emission varies to some extent with latitude up to ±30%, and while this presents no problem in a sensor which has some type of scanning, because the horizon is used as a discontinuity, it will produce serious errors in radiation balance horizon sensors.

Summary of the invention

For any particular altitude of vehicle above the planet, the present invention provides completely accurate results with out any moving parts, whether continuous or for periodic adjustment, and with a greatly reduced complexity of electronic components. In another modification of the present invention, the possibility of adjusting for perfect compensation at differing altitudes is included, which still requires no continuously movable elements, and which, though necessitating somewhat more electronics, uses simple and reliable circuits and other elements.

Brief description of the drawings

FIG. 1 is a diagrammatic plan view of a planet horizon with detector fields of view;

FIG. 2 is a block diagram of a simplified and fixed electronic system for any single altitude; and FIG. 3 is a similar block diagram for a modification permitting adjustment electronically for varying altitudes.

Description of the preferred embodiments

FIG. 1 shows, in dashed lines, the disk of a planet with four sets of detectors about two orthogonal axes. The pair of detector systems for one orthognal axis, for example pitch, is illustrated in mre detail. A pair of radiation detectors showing fields of view 2 and 3 are illustrated at the horizon on the pitch axis. It will be assumed that the radiance at the horizon for the planet disk for detector field of view 2 is represented by $N_A$ and the radiance for the corresponding horizon for detector field of view 3 by $N_B$. Similar detector fields of view 4 and 5 are shown for the other orthogonal axis.

For simplicity the detector fields of view will be considered to have sidewise width of unity as is shown in FIG. 1, and they are of equal extent subtending an angle of $\theta_m$. The subtense of the portion of detector field of view 2 which sees the planet disk is shown as $\theta_A$, and the corresponding subtense for field of view 3 $\theta_B$. The two detectors are connected in opposition as will be described in more detail in conjunction with following figures. The basic equation for a null signal is as follows:

Eq. 1          $\theta_A N_A - \theta_B N_B = 0$

If the radiances $N_A$ and $N_B$ are the same, a null signal will be developed when $\theta_A = \theta_B$, in other words, when the vehicle is in level flight as far as the pitch axis is concerned. However, usually the radiance is not the same as is shown in FIG. 1, and in fact even in the 14–16μ $CO_2$ band, variations as great as ±30% can occur with latitude. Obviously, of course, if these radiances are not the same, there will not be a null signal when the vehicle is in level flight with respect to the pitch axis. In other words, the horizon sensor does not give a reliable and accurate indication.

For a given altitude $(\theta_A+\theta_B)$ is a constant which we shall call $\theta_{AB}$. Solving Equation 1 for first $\theta_A$ and then $\theta_B$ we have:

Eq. 2
$$\theta_A = \frac{N_B}{N_A+N_B} \theta_{AB}$$

$$\theta_B = \frac{N_B}{N_A+N_B} \theta_{AB}$$

The null error, E, is half the difference between the two angles.

Eq. 3
$$E = \frac{\theta_A - \theta_B}{2} = \frac{(N_B - N_A)}{(N_A + N_B)} \frac{\theta_{AB}}{2}$$

Taking the worst case of $$\frac{N_B}{N_A} = \frac{0.7}{1.3}$$

we have an error of 15% $\theta_{AB}$. Thus if the total field is 30°, and the altitude is such that the horizon is at the mid position, the error can be as much as 4.5°.

Compensation is effected in the present invention by providing two detectors 6 and 7 having fields of view K. These detectors are connected in opposition, as appears in solid lines in FIG. 2 and also in FIG. 3. These correction fields view the planet only, earth in the case of the specific description. Now Equation 1 becomes the following:

Eq. 4  $(\theta_A N_A - K N_A) - (\theta_B N_B - K N_B) = 0$

Solving for the error as previously we have:

Eq. 5
$$E = \frac{(N_B - N_A)}{(N_A + N_B)} \frac{\theta_{AB}}{2} - \frac{(N_B - N_A)}{(N_A + N_B)} K$$

Thus we see that if we make the field of view K equal to ½ $\theta_{AB}$, the radiation error is completely eliminated at this altitude. If the altitude changes, the cancellation will no longer be complete but there will still be a great reduction in the error.

From our previous example of a 30° primary field let us optimize for an altitude where the horizon is half way into the field, i.e., K=15°. With no correction we had ±4.5° of error while with correction we have zero error. If the altitude decreases so that the null position rises 5° within the field (10° increase in earth subtense) the error without correction goes to ±6° whereas with correction it becomes ±1.5°.

The same correction is effected for the roll axis, the correcting fields being shown at 8 and 9 on FIG. 1.

FIG. 2 shows in solid lines the block diagram with detectors 2 and 3 connected in opposition, and in series with the correcting fields 6 and 7 similarly connected. Equation 4 appears at the input of amplifier 10 as is shown in FIG. 2. Obviously, then, the circuits are duplicated for the roll axis, and as they are connected in the same manner, they are not shown.

If altitude remains the same, the correction is perfect with no additional electronics or moving parts. If the altitude changes a little, for example in the case of a satellite in a not too eccentric orbit, the correction may be adequate, and this extremely simple and reliable modification may be used. However, if there is considerable altitude variation, it may be desirable to obtain better correction at the cost of some small complication. The problem may arise because the exact altitude of a vehicle may not be known at the time the horizon sensor is built, or even after it has been launched into orbit. In such case, an adjustment can be made for the desired altitude in one of two ways which involve comparatively small modifications and do not necessarily involve great additional complexity. Two typical types of adjustment are illustrated, one optical and one electrical. In FIG. 1 there is shown in dashed lines a rotatable disc 16 with four lobes. This can be adjusted at the time of launch when the desired altitude is more or less known, for example by a simple screwdriver slot. The electronic adjustment is shown in dashed lines as a potentiometer 15 in FIG. 2. In either case, it adjusts the correcting fields for the particular altitude desired. Obviously, of course, there must be adjustments for both sets of detectors, i.e. for both roll and pitch.

The adjustment, whether optical or electrical, once made at launch, remains set, and so adds no additional moving parts to the sensor, and of course does not add to the electronics. A slightly more complicated situation can be presented if the launch is not quite perfect and the altitude of the satellite turns out to be something different than that planned. In such a case it is possible to provide servo drive which operates on command from the ground to make the adjustments in either optical or electrical modification. This does add to the complexity of the horizon sensor, but does not introduce additional parts which move continuously. In other words, once the adjustment is made the reliability is not decreased.

In case of a very eccentric orbit, there may be needed a continuous adjustment, and this is shown in FIG. 3. It requires two amplifiers 11 and 12 and a summing circuit 14. One of the amplifiers, for example 11, may have a fixed gain, and the other a variable gain. The gain in the two amplifiers, or in one amplifier 12, can be set by an altitude signal $f(\theta_{AB})$. Many satellites are provided with altitude sensors for other purposes, and as these usually put out a voltage, it can be used to vary the gain of amplifier 12. It should be noted that while $\theta_A + \theta_B$ is a constant for any particular altitude, it does not change linearly with change of altitude, but is rather a trigonometric function, and this is shown in FIG. 3 by specifying that the signal and the resulting output of amplifier 12 contain a factor expressed as a function of $\theta_{AB}$. The particular servo drive or telemetry amplifier of altitude sensors do not form any part of the present invention, and they are therefore illustrated only diagrammatically. Needless to say, any suitable type may be used. Of course in FIG. 3 the altitude sensor must include in its signals or be capable of having derived therefrom a voltage of suitable magnitude.

A complete horizon sensor which gives information about both pitch and roll is shown. If it is desired to obtain information with respect to only one axis, of course the other pair of sensors is eliminated.

The present invention is not concerned with any particular type of radiation sensor even in the more specific aspect where infrared sensors responsive to the 14–16μ infrared are used. The sensors may be of any known type such as thermistor bolometers, thermopiles, and the like. Also, although for clarity of illustration the correcting sensors such as 6 and 7 have been shown as separate sensors, they could be combined respectively with sensor 2 and sensor 3 using a suitably located central electrode.

I claim:

1. A horizon sensor of the balanced radiation type comprising in combination
   (a) a pair of radiation sensors and means for deriving a field of view therefor including two horizons, the sensors being electrically connected in opposition,
   (b) a pair of correcting sensors seeing only a planet disk of equal field of view and connected electrically in opposition,
   (c) the correcting sensors being connected in series with the other two sensors and producing a signal output which is zero when the fields of view of the first two sensors are symmetrical with respect to the horizon.

2. A horizon sensor according to claim 1 for signalling attitude with respect to two orthogonal axes in which the sensors are duplicated for the other axis.

3. A horizon sensor according to claim 2 in which the sensors are responsive substantially only to the 14–16µ $CO_2$ radiation band.

4. A horizon sensor according to claim 2 comprising means for adjusting the sum of the correcting sensors in accordance with altitude.

5. A horizon sensor according to claim 4 in which the correction varies the optical cross-section of radiation striking the correcting sensors.

6. A sensor according to claim 4 in which the correction sensors' signals are electrically modified in accordance with altitude.

7. A sensor according to claim 4 in which the sensors are responsive substantially only to $CO_2$ radiation from 14–16µ.

8. A sensor according to claim 6 in which the sensors are responsive substantially only to $CO_2$ radiation from 14–16µ.

References Cited

UNITED STATES PATENTS

| | | | |
|---|---|---|---|
| 3,381,569 | 5/1968 | Hatcher | 250—83.3 X |
| 3,032,660 | 5/1962 | Kim | 250—83.3 |
| 3,118,063 | 1/1964 | Kaufman | 250—83.3 |

ARCHIE R. BORCHELT, Primary Examiner

D. L. WILLIS, Assistant Examiner

U.S. Cl. X.R.

250—203